(12) United States Patent
Louis et al.

(10) Patent No.: US 12,104,498 B2
(45) Date of Patent: Oct. 1, 2024

(54) INLET CONE FOR AN AIRCRAFT TURBOMACHINE

(71) Applicant: SAFRAN AIRCRAFT ENGINES, Paris (FR)

(72) Inventors: Alban Francois Louis, Moissy-Cramayel (FR); Jean-Yves Picart, Moissy-Cramayel (FR); Morgan Balland, Moissy-Cramayel (FR); Florent Robert Andre Godin, Moissy-Cramayel (FR); Baghdad Achbari, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/551,624

(22) PCT Filed: Mar. 23, 2022

(86) PCT No.: PCT/FR2022/050536
§ 371 (c)(1),
(2) Date: Sep. 21, 2023

(87) PCT Pub. No.: WO2022/200733
PCT Pub. Date: Sep. 29, 2022

(65) Prior Publication Data
US 2024/0167394 A1    May 23, 2024

(30) Foreign Application Priority Data
Mar. 25, 2021   (FR) ...................................... 2103001

(51) Int. Cl.
*F01D 25/02*    (2006.01)
*B64D 33/02*    (2006.01)

(52) U.S. Cl.
CPC .............. *F01D 25/02* (2013.01); *B64D 33/02* (2013.01); *B64D 2033/0233* (2013.01); *F05D 2250/14* (2013.01); *F05D 2250/232* (2013.01)

(58) Field of Classification Search
CPC ........... F01D 25/02; F01D 5/02; B64D 15/16; B64C 11/14
See application file for complete search history.

(56) References Cited

U.S. PATENT DOCUMENTS 2,560,287 A * 7/1951 Harper ................... B64D 15/16
                                                    244/134 A
4,393,650 A * 7/1983 Pool ........................ F02C 7/047
                                                    60/39.093

(Continued)

FOREIGN PATENT DOCUMENTS

EP    3572642 A1    11/2019
FR    2943725 A1    10/2010

OTHER PUBLICATIONS

International Search Report received for PCT Patent Application No. PCT/FR2022/050536, mailed on Jul. 20, 2022, 7 pages (2 pages of English Translation and 5 pages of Original Document).

*Primary Examiner* — J. Todd Newton
*Assistant Examiner* — Cameron A Corday
(74) *Attorney, Agent, or Firm* — WOMBLE BOND DICKINSON (US) LLP (57) ABSTRACT

An inlet cone for an aircraft turbomachine, having at least one first portion made of a first material, referred to as rigid material, and at least one second portion made of a second material which has a hardness less than that of said first material and which is referred to as flexible material, these second portions being configured to deform elastically in the radial direction with respect to the axis when the cone is being driven to rotate.

14 Claims, 6 Drawing Sheets

(56) References Cited

U.S. PATENT DOCUMENTS

| | | | | |
|---|---|---|---|---|
| 6,439,505 B1* | 8/2002 | Hyde | ................ | B64C 1/36 |
| | | | | 244/134 A |
| 2016/0003146 A1 | 1/2016 | Delapierre et al. | | |
| 2016/0122034 A1* | 5/2016 | Bortoli | ................ | F01D 25/02 |
| | | | | 416/142 |
| 2017/0211579 A1* | 7/2017 | Klauke | ................ | F02C 7/04 |
| 2019/0360399 A1* | 11/2019 | Harvell | ................ | F02C 7/047 |
| 2022/0235670 A1* | 7/2022 | Batonnet | ................ | F01D 5/025 |

* cited by examiner

INLET CONE FOR AN AIRCRAFT TURBOMACHINE

TECHNICAL FIELD OF THE INVENTION

The field of the present invention is that of the turbomachines, in particular that of gas turbine engines, for example and not restrictively a turbojet engine or an aircraft turboprop.

The present invention relates more particularly to an air inlet cone for a turbomachine.

TECHNICAL BACKGROUND

The prior art comprises in particular the document US-A1-2016/122034.

Turbomachines extending along a longitudinal axis and comprising, from upstream to downstream in the flow orientation of the gases, a fan, one or more compressor stages (e.g. a low-pressure compressor and a high-pressure compressor), a combustion chamber, one or more turbine stages (e.g. a high-pressure turbine and a low-pressure turbine), and a gas exhaust nozzle are known in the prior art.

Typically, such turbomachines also comprise upstream an air inlet cone which is mounted on the fan, for example by means of a generally annular upstream shell itself connected to a low-pressure compressor shaft of the turbomachine. The connection between the inlet cone and the upstream shell is generally made by means of bolted assemblies. The downstream end of the shell is flush with the platforms of the fan vanes, in the forward aerodynamic continuity of the fan.

Such an inlet cone comprises an upstream end of conical or elliptical shape centred on an axis of rotation of the inlet cone, also corresponding to the longitudinal axis of the fan and the entire turbomachine.

Figure 2A:
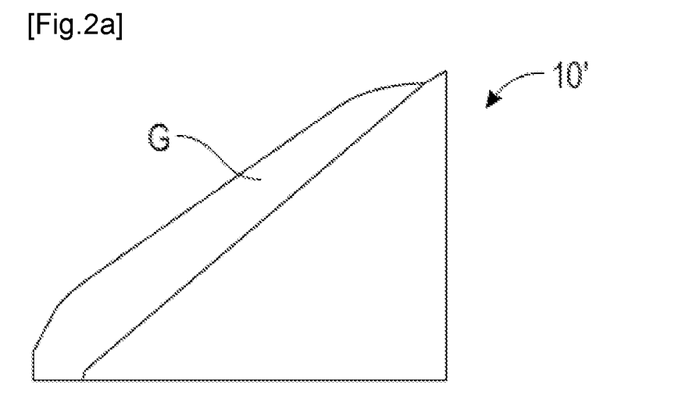
FIG. 2a shows schematically a half-view in axial cross-section of an ice accretion on a prior art inlet cone.
Figure 2B:
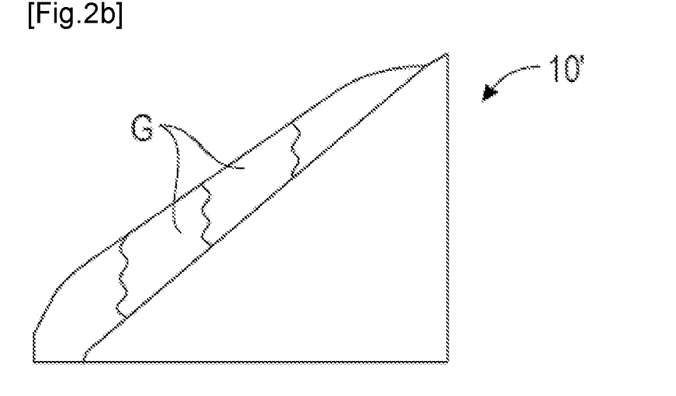
FIG. 2b shows schematically a half-view in axial cross-section of a fragmentation of the ice from the inlet cone in FIG. 2a, FIG. 2c shows schematically a half-view in axial cross-section of a detachment of randomly large pieces of ice from the inlet cone of FIG. 2a, FIG. 3 is a schematic front perspective view of a prior art inlet cone.
Figure 2C:
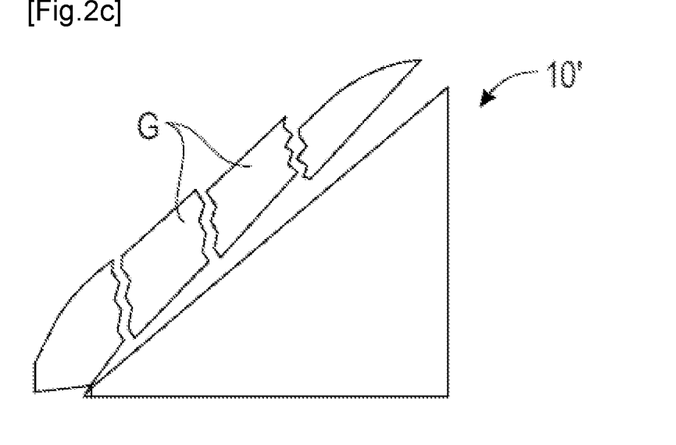

This inlet cone is known to be a point on the turbomachine that favours ice accretion, particularly when the turbomachine is in steady speed, as shown in FIG. 2a. As a result, the ice forming on the inlet cone could reach a large size before breaking off into large pieces of ice, particularly during the acceleration phases of the turbomachine, as shown in FIGS. 2b and 2c. These large pieces of ice present a risk, when they eventually break away from the cone, of damaging the fan vanes they hit or the elements further downstream of the fan vanes.

The ice build-up can also accumulate unevenly on the inlet cone, leading to undesirable vibrations in the turbomachine.

To overcome this problem, it has been proposed to install a de-icing system, the aim of which is to ensure that the ice accumulated on the tip of the cone is ejected before it reaches a critical size. However, this type of system is expensive in terms of mass and overall dimension, and particularly tricky to install because of the rotating nature of the inlet cone equipped.

Figure 3:
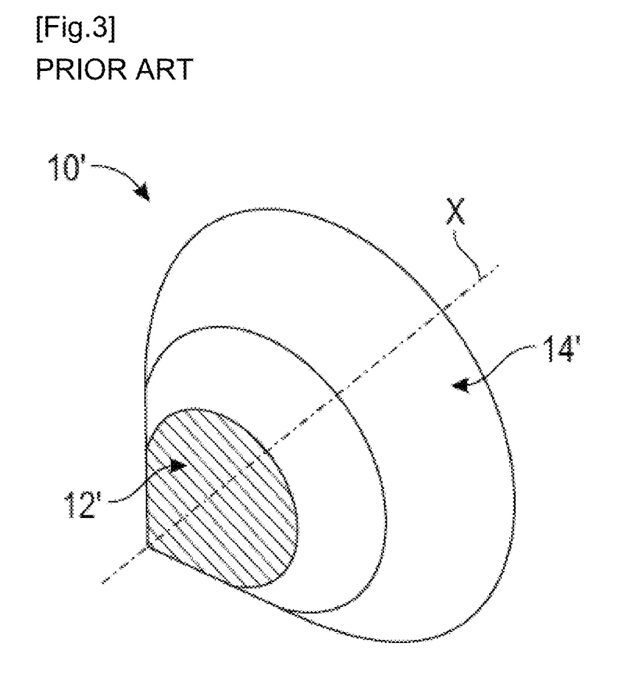

It has also been proposed to produce, as shown in FIG. 3, an inlet cone 10' with an upstream tip 12' made of a flexible material and a downstream body 14' made of a rigid material. During operation, the layer of ice accumulated, particularly at the level of the connection where the tip meets the body, is weakened to encourage the ice to detach. However, this way of detaching the layer of ice, by weakening it and allowing the cracks to propagate along this layer, may be slower than expected in the case of in-flight operation of the turbomachine. The larger the layer of ice, the slower and more difficult it is to form cracks in this layer. In addition, the generation of cracks directly between the part of the cone made of flexible material and the accreted ice, particularly at low temperatures (i.e. between −30° C. and 15° C.), is not sufficient since the adhesion of the ice to the cone is stronger than the force of detachment of the ice by centrifugal force. Such a solution is therefore not sufficient to quickly detach the layer of ice forming on the inlet cone into several small pieces without damaging the components of the turbomachine downstream of the cone.

In this context, it is interesting to propose a solution that allows to overcome the disadvantages of the prior art, in particular by introducing a new geometry for an air inlet cone that is more conducive to favour the controlled breakage of the ice during operation.

SUMMARY OF THE INVENTION

The present invention thus proposes an inlet cone for an aircraft turbomachine, this inlet cone being configured to be driven in rotation about an axis X and comprising a body of conical or elliptical shape and on which ice is capable of forming, said body having at least one first portion made of a first material referred to as rigid material, and at least one second portion made of a second material which has a hardness less than that of said first material and which is referred to as flexible material.

According to the invention, said first portion is monobloc and formed of a plurality of axial sections connected to each other by partitions extending in a longitudinal direction with respect to the axis X, said sections and said partitions defining between them housings, and in that said body comprises several second portions located in said housings, these second portions being configured to deform elastically in the radial direction with respect to the axis X when the cone is driven in rotation.

This design of the present invention allows to make it easier to reduce the size of the ice accreted on the inlet cone of the turbomachine during operation, to limit the impact of the ice de-accretion phenomenon on the turbomachine.

To achieve this, the cone comprises several second portions and a single first portion. The second portions are made of a flexible or elastically deformable material (such as an elastomer), so as to allow each second portion to deform and move radially (with respect to the axis X) when the cone is rotated, and also to continue to function at variations in external temperature (such as, for example, a low temperature of −30° C. to 15° C.). This helps to break up the ice accretions forming on the external surface of the cone. The first portion is made of a rigid material (such as aluminium), so as to form a single, stable base support for holding the second portions.

According to the configuration of the invention, the second portions are separated from each other by the axial sections and/or the partitions of the first portion. This has the advantage of forming a body of the cone with an alternating pattern between a rigid material of the first portion and a flexible material of the second portions.

During operation (on the ground or when the turbomachine is in flight) and when ice is accreted onto the cone, a deviation in deformation (or displacement) under centrifugal forces of the second portions is observed in respect to the first portion. This deviation generates stresses in the ice at the interface between the rigid and flexible materials. This allows the ice to be fragmented into several pieces at the level of each of the interfaces of the alternating pattern of the body of the cone. In this way, the detached pieces of ice are of a size that is calibrated and acceptable for being projected onto components downstream of the cone (such as the fan vanes) without damaging them.

Moreover, the detached pieces of ice are released regularly and in several times. For example, during acceleration phases of the turbomachine, the ice located at the highest radius of the cone is detached first compared to that located at the tip of the cone.

The invention therefore has the advantage of being based on a simple design, offering a very high reliability and low cost and overall dimension.

The inlet cone for the aircraft turbomachine according to the invention may comprise one or more of the following characteristics, taken in isolation from one another or in combination with one another:

1 said body comprises an end forming a tip made of said second material;
each of the housings has a generally arcuate shape around the axis, and the second portions are configured to completely fill these housings;
1 each of the second portions has a Young's modulus of between 1 and 10 MPa, and preferably from 1 to 4 MPa;
each of the second portions has a maximum thickness of between 2 and 10 mm, preferably 4 to 6 mm, the thickness being measured in a longitudinal direction with respect to the axis X;
each of the second portions comprises an external surface with a maximum radius of between 20 and 100 mm, preferably between 40 and 80 mm, the radius being measured with respect to the axis X;
1 each of the second portions has a density of between 500 and 1500 Kg/m$^3$, and preferably 1200 Kg/m$^3$;
1 each axial section is an angular sector of between 10 and 90°;
each flexible portion is made of elastomer, silicone, rubber or polytetrafluoroethylene (PTFE);
said rigid portion is made of a composite or metallic material, for example aluminium.

The present invention also relates to an aircraft turbomachine comprising an inlet cone in accordance with the invention.

The present invention also relates to a method for using a turbomachine according to the invention, wherein said cone is rotated either at a first speed V1 which is at least greater than 5000 rpm, or at a second speed V2 which is lower than said first speed V1.

According to the invention, when said cone rotates at the first speed V1, the flexible portions are configured to fragment ice deposited on the cone, moving radially with respect to the axis X, and when said cone rotates at the second speed V2 or is at a standstill, the flexible portions are immobile.

The radial displacement of said flexible portions can be greater than 0.02 mm, preferably between 0.02 and 0.2 mm.

The present invention also relates to an aircraft comprising a turbomachine according to the invention.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

By convention in the present application, the terms "inner" and "outer", and "internal" and "external" are defined radially with respect to a longitudinal axis X of the aircraft engine of the turbomachine. For example, a cylinder extending along the axis X comprises an inner face facing the axis of the engine and an outer surface opposite its inner surface. By "Axial" or "axially" is meant any direction parallel to the axis X, and "transversely" or "transversal" is meant any direction perpendicular to the axis X. Similarly, the terms "upstream" and "downstream" are defined in relation to the flow orientation of the air in the turbomachine.

Figure 1:
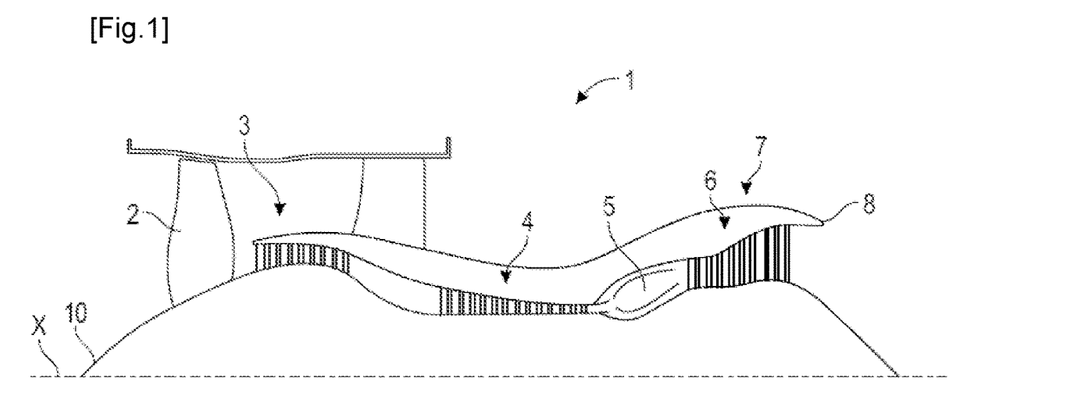
FIG. 1 is a schematic half-view of an aircraft turbomachine in axial cross-section, according to one of the embodiments of the invention.

FIG. 1 shows a turbomachine 1 of double flow, in particular for an aircraft. However, this is not a limit and the turbomachine may be of another type, such as a turboprop.

The turbomachine 1 extends along a longitudinal axis X and comprises from upstream to downstream, in the flow orientation of the gases, a fan 2, one or more compressor stages (for example a low-pressure compressor 3 and a high-pressure compressor 4), a combustion chamber 5, one or more turbine stages (for example a high-pressure turbine 6 and a low-pressure turbine 7), and an exhaust nozzle 8 for the gases. The fan 2, low-pressure compressor 3 and low-pressure turbine 7 are connected to a low-pressure shaft extending along a longitudinal axis. The high-pressure compressor 4 and high-pressure turbine 6 are connected to a high-pressure shaft arranged around the low-pressure shaft. The low-pressure turbine 7 drives the low-pressure shaft in rotation, while the high-pressure turbine 6 drives the high-pressure shaft in rotation.

The turbomachine 1 also comprises, upstream of the fan 2, an air inlet cone 10, 10' which is mounted on the fan 2 by means of a shell (not shown), preferably by bolt-type attachments. The shell is located downstream of the inlet cone 10, 10' and this shell is also connected to the low-pressure shaft.

The inlet cone 10, 10' together with the shell are connected to the rotor, in other words to the rotating parts of the turbomachine 1. The inlet cone 10, 10' therefore rotates around the longitudinal axis X.

FIGS. 2a, 2b, 2c and 3 illustrate the inlet cone 10' of the prior art, as described above, in the technical background of the present application.

Figure 4:
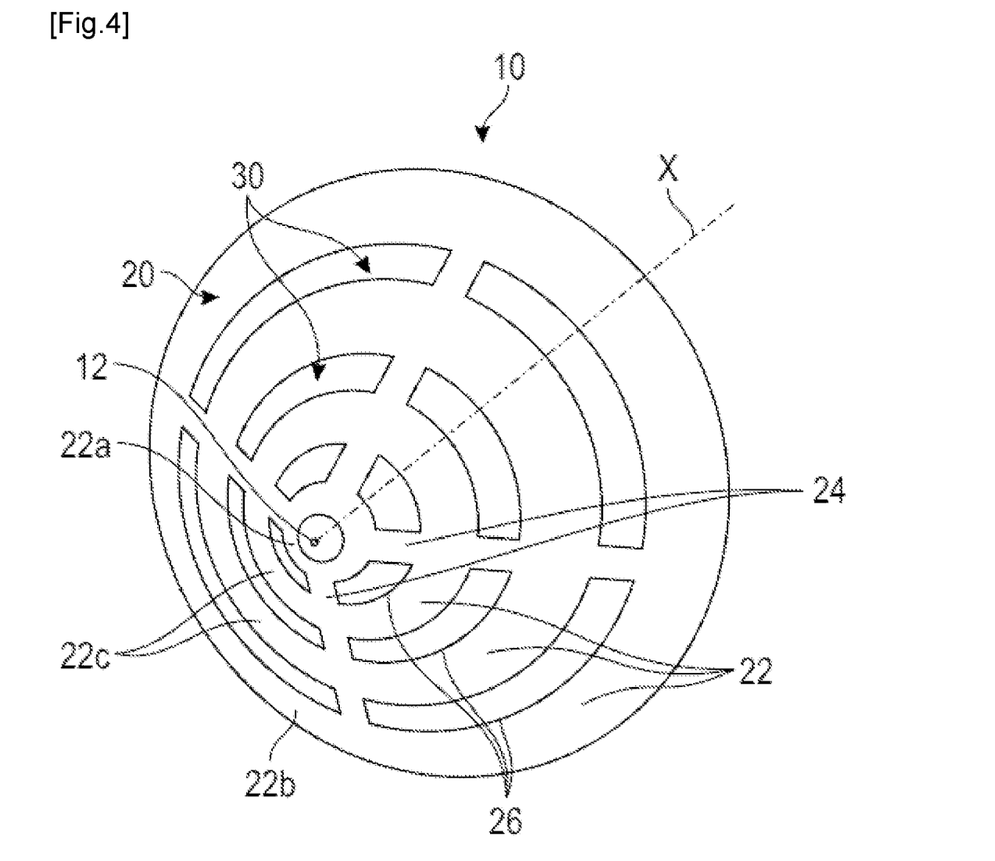
FIG. 4 is a schematic front perspective view of an inlet cone according to a first embodiment of the invention.

FIG. 4 shows an inlet cone 10 according to the invention. This cone 10 is configured, on the one hand, to be driven in rotation about the axis X and, on the other hand, to fragment the ice accreted on the cone 10 into several pieces of calibrated size so as not to damage, in particular, the vanes of the fan 2.

To this end, the cone 10 comprises a cone-shaped body extending around an axis of revolution. This axis of revolution of the cone 10 corresponds to the axis X of the turbomachine.

The body of the cone 10 comprises a first portion 20 made of a first material referred to as rigid material.

The first portion 20 is in the form of a single, monobloc piece. The first portion 20 is formed by a plurality of axial sections 22 which are connected together by partitions 24. The partitions 24 extend in a longitudinal direction with respect to the axis X. The plurality of axial sections 22 may be formed by at least one upstream section 22a and one downstream section 22b. The upstream section 22a has a smaller diameter than the downstream section 22b. The plurality of sections 22 may also comprise one or more intermediate sections 22c interposed between the upstream 22a and downstream 22b sections. Each intermediate section 22c has a smaller diameter than the downstream section 22b and a larger diameter than the upstream section 22a.

In the example shown in FIG. 4, each section 22 comprises as many sectors as there are partitions 26 to which it is connected. Each sector of the section extends between two adjacent partitions.

The plurality of axial sections 22 and the partitions 24 define housings 26 between them. Each housing 26 can be an opening. In the example, each housing 26 may have a generally arcuate shape with respect to the axis X.

The first material can be a metallic material (such as aluminium) or a composite material.

The body of the cone 10 also comprises a number of second portions 30, each made from a second material referred to as flexible material. The second material has a lower hardness than the first material. For example, the hardness of the materials is defined by the Young's modulus.

Each second portion 30 may have a Young's modulus of between 1 and 10 MPa. Preferably, the Young's modulus of the second portions 30 is between 1 and 4 MPa.

Each second portion 30 may have a density of between 500 and 1500 Kg/m$^3$. Preferably, the density is 1200 Kg/m$^3$.

The second material can be an elastomer, silicone, rubber or polytetrafluoroethylene (PTFE).

The cone 10 can have a maximum radius of 50 cm.

In the example shown in FIG. 4, each second portion 30 is an angular sector. Each angular sector can be between 5 and 345°. The angular sector is preferably between 5 and 180°. Even more preferably, the angular sector is between 10 and 90°.

The second portions 30 are located in the housings 26 in the first portion 20. In the example, the second portions 30 are spaced apart and separated from each other by at least one of the sections 22 and/or partitions 26. This gives the body of the cone 10 an alternating pattern, in particular between the sections 22 of the first portion 20 and the second portions 30 (in a longitudinal direction with respect to the axis X).

Each second portion 30 has a complementary shape to that of the corresponding housing 26. In this way, the second portions 30 are configured to completely fill the housings.

Figure 5A:
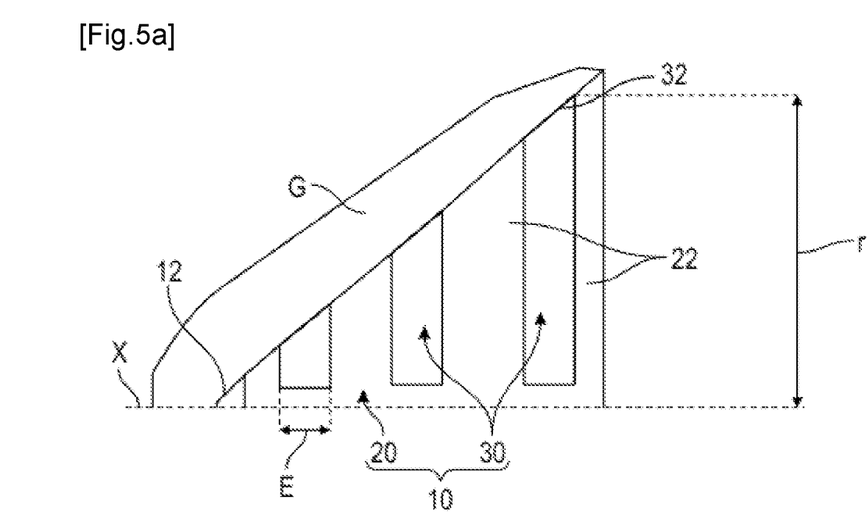
FIG. 5a shows schematically a half-view in axial cross-section of an ice accretion on the entrance cone of FIG. 4.

Each of the second portions 30 can have a maximum thickness E of 2 to 10 mm, preferably the thickness is 4 mm. The thickness E is measured in a longitudinal direction with respect to the axis X (FIG. 5a). The radial direction is substantially perpendicular to the axis X.

Each of the second portions 30 comprises an external surface 32 which can have a maximum radius r of 20 to 100 mm, preferably a radius of 40 mm. The radius r is measured in a radial direction with respect to the axis X (FIG. 5a).

The body of the cone 10 may comprise an end forming a tip 12. In the example, the tip 12 is made from the second material. Alternatively, the tip 12 is made from the first material, in which the tip 12 and the first portion 20 are monobloc.

The alternating pattern between the first and second materials according to the invention can be applied to any type of air inlet cone of a turbomachine, while adapting the angles and lengths of the tip according to the dimensions of the inlet cone. In addition, the hardness of the second material is a parameter that can vary according to the speed of rotation, the angle of attack and the dimensions of the inlet cone.

According to other variants not illustrated, the housings 26 can be a helical groove and the second portions 30 can have a spiral configuration, or longitudinal grooves and the second portions 30 can have a rectilinear shape. These variants also allow other patterns to be produced so that the first and second materials alternate on the body of the cone.

Generally speaking, the second portions 30 are capable of elastic deformation in the radial direction when the cone 10 is driven in rotation. This allows to generate stresses in the ice formed at the interface of the rigid and flexible materials, so as to fragment the ice into several pieces of calibrated size acceptable for an impact to the fan vanes 2.

Figure 5B:
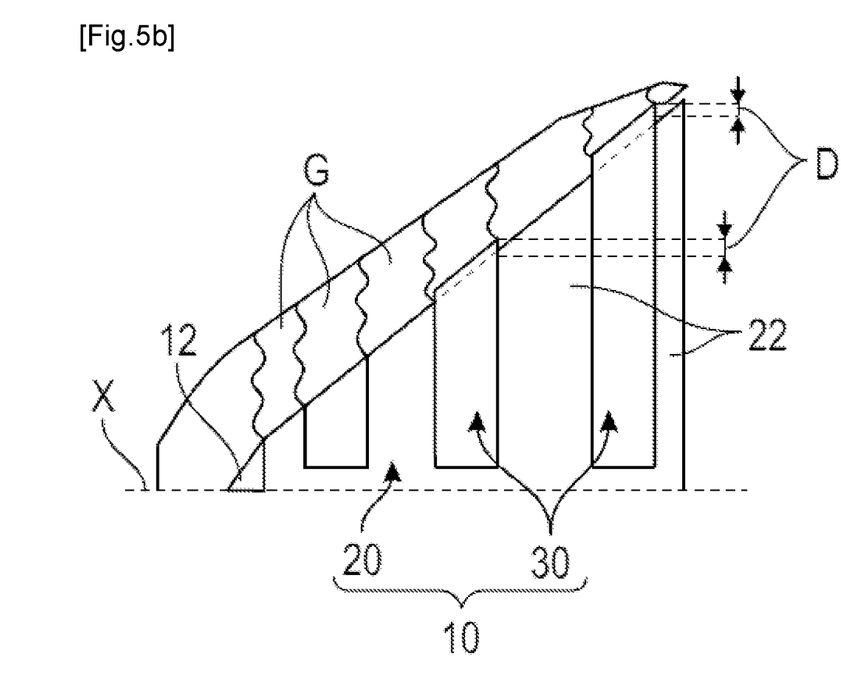
FIG. 5b shows schematically a half-view in axial cross-section of a fragmentation of the ice from the inlet cone in FIG. 5.
Figure 5C:
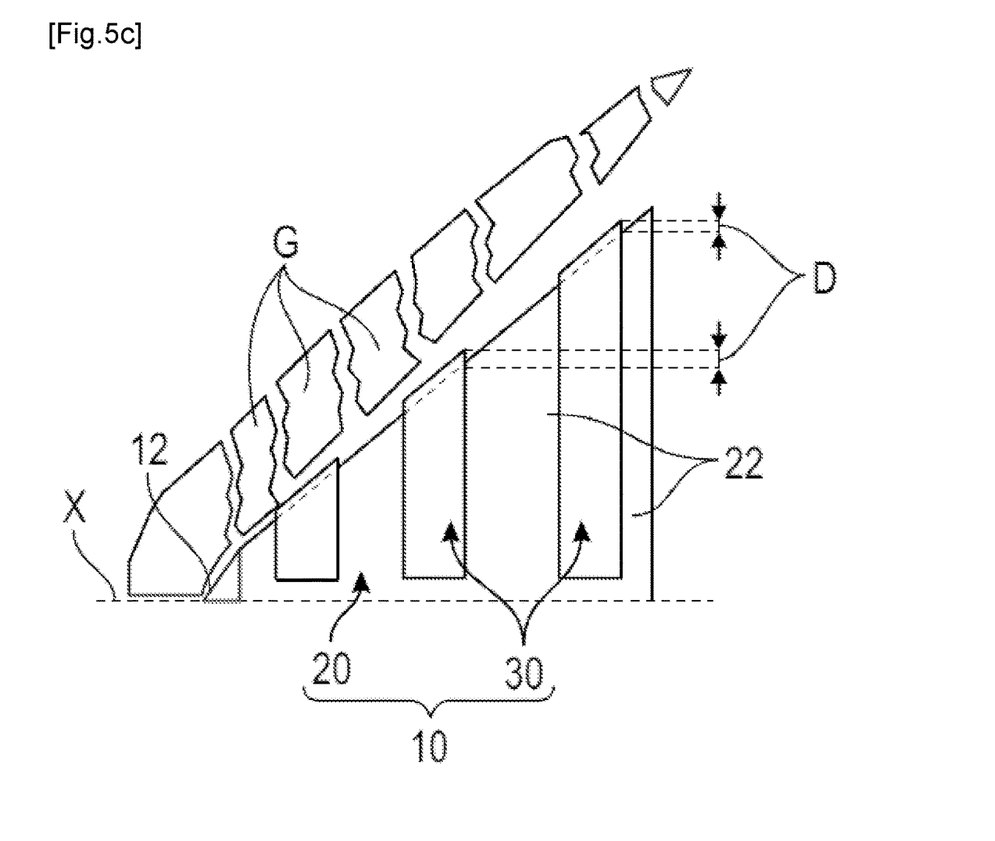
FIG. 5c shows schematically a half-view in axial cross-section of a detachment of pieces of ice of controlled and reduced size from the inlet cone of FIG. 4.

With reference to FIGS. 5a to 5c, the present application describes the ice fragmentation conferred by the specific configuration of the cone 10 of the invention.

When the turbomachine is running at steady state (i.e. at a speed of 3000 rpm or less), as shown in FIG. 2a, the ice G forms on the external surface of the inlet cone 10. When the cone 10 is rotated at a second speed V2 by the turbomachine, there is no relative movement between the rigid and flexible materials. The second portions 30 are therefore immobile.

When the cone 10 is rotated at a first speed V1 by the turbomachine, as shown in FIG. 5b, there is a deviation in deformation D (or displacement) under centrifugal force of the second portions 30 with respect to the first portion 20 in a radial direction with respect to the axis X. This deviation generates cracks which fragment the ice G at the interface between the rigid and flexible materials. This allows to fragment the ice G into several small pieces.

FIG. 5c illustrates the detachment of the pieces of ice, which are reduced in size so as not to damage the components downstream of the cone 10.

The first speed V1 may be at least 5000 rpm and the second speed V2 may be less than 5000 rpm.

The deformation deviation D (or the radial displacement) of the second portions is greater than 0.02 mm. Preferably, the deviation is between 0.02 and 0.20 mm.

The dimensions (shape, thickness, size, hardness, etc.) and the position on the body of the cone 10 of the housings 26 in the first portion 20 and in the second portions 30 can vary according to the desired size of the pieces of ice to be fragmented and the type of inlet cone.

When the cone 10 rotates at the second speed V2, the turbomachine can be accelerated to achieve the desired radial displacement of the second portions and achieve a fragmentation of the ice.

Advantageously, the radial displacement D of the second portions 30 of the cone 10 is proportional to at least one of the following dimensioning parameters:

to the square of the speed of rotation of the cone 10, to the square of the thickness of the second portions 30, to the hardness of the second material, and at the distance of the second portions 30 from the axis X.

Thus, at least one of the aforementioned dimensioning parameters is modified to obtain a radial displacement of at least 0.02 mm on each of the second portions 30 and to break a maximum radial ice thickness of 15 mm on the cone 10, as summarised in the following table (Table 1) by way of example.

TABLE 1

| | Reference configuration | Lower speed and modified thickness E | Lower speed and Young's modulus of the second modified material | Greater radius r and modified thickness E of the second flexible portion | Greater radius r and Young's modulus of the second modified material |
|---|---|---|---|---|---|
| Turbomachine speed (rpm) | 5000 | 37500 | 37500 | 5000 | 5000 |
| Young's modulus of the second material (Mpa) | 2.8 | 2.8 | 1.6 | 2.8 | 1.4 |
| Radial thickness E second flexible portion (mm) | 4.0 | 5.3 | 4.0 | 2.8 | 4.0 |
| Radius r of the second flexible portion (mm) | 40 | 40 | 40 | 80 | 80 |
| Density of the second flexible portion (Kg/m$^3$) | 1200 | 1200 | 1200 | 1200 | 1200 |

By way of example, the radial displacement of the second portions 30 of the cone 10 of the invention is measured as a function of the speed of the turbomachine.

For this purpose, the cone 10 with a maximum radius of 40 mm comprises a first portion 20 made of metal (such as aluminium) and second portions 30 made of elastomer with a Shore hardness A of 50 (at a temperature of 23° C.). The radial displacements of the second portions were measured under centrifugal force and according to the presence or absence of ice at 5000 and 7500 rpm. For example, the radial thickness of the ice formed on the cone is around 10 mm.

These measurements of the radial displacement of the second portions 30 are summarised in the following table (Table 2).

TABLE 2

| Turbomachine speed (rpm) | Ice presence on the inlet cone | Radial displacements measured at the interface of the rigid and flexible materials (mm) | Maximum radial displacements measured (mm) |
|---|---|---|---|
| 5000 | Without ice | 0.02 | 0.06 |
| | With ice | 0.08 | 0.15 |
| 7500 | Without ice | 0.06 | 0.14 |
| | With ice | 0.14 | 0.34 |

Figure 6:
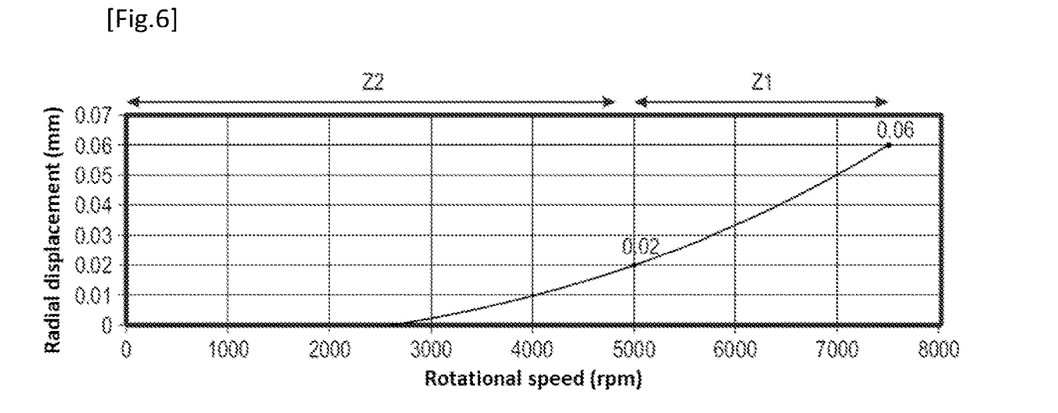
FIG. 6 illustrates a graph showing a radial displacement of the second portions of the cone of the invention as a function of the rotation speeds of the cone.

By way of example, FIG. 6 illustrates the effect of the radial displacement of the second portions 30 of the cone 10 of the invention on the fragmentation of ice accreted on the cone 10 (in particular, at the interface between the rigid and flexible materials), is determined as a function of the different rotational speeds of the cone 10 (and consequently of the turbomachine).

To achieve this, the cone 10 comprises a first portion 20 made of metal (such as aluminium) and second portions 30 made of elastomer. The elastomer has a Shore hardness A of 50 (at a temperature of 23° C.) and a density of 1200 Kg/m$^3$. The second portions 30 are 4 mm thick. The second portion 30 of the body of the cone, which has an external surface with a larger diameter, has a radius of 40 mm.

The null speed correspond to the cone at a standstill, the stability speed correspond to approximately 3,000 rpm and the maximum speed (corresponding to an acceleration phase) are approximately 7,500 rpm.

In FIG. 6, the area Z1 corresponds to the radial displacements of the second portions of the cone, in which a fragmentation and a detachment of the pieces of ice with a reduced and acceptable size can be observed. This area Z1 extends between 0.02 and 0.06 mm. A clear fragmentation of the ice is therefore observed at the interface between the rigid and flexible materials, from a radial displacement of 0.02 mm.

In FIG. 6, the area Z2 corresponds to minimal displacement or no radial displacement of the second portions of the cone, in which a fragmentation and a detachment of the ice pieces are not observed.

The invention claimed is:

1. An inlet cone for an aircraft turbomachine, this inlet cone being configured so as to be driven in rotation about an axis and comprising a body of conical or elliptical shape and on which ice is capable of forming, said body having at least one first portion made of a first material referred to as rigid material, and at least one second portion made of a second material which has a hardness less than that of said first material and which is referred to as flexible material, wherein said first portion is monobloc and formed by a plurality of axial sections connected together by partitions extending in a longitudinal direction relative to the axis, said sections and said partitions defining between them housings, and in that said body comprises a plurality of second portions located in said housings, these second portions being configured to deform elastically in the radial direction with respect to the axis when the cone is driven in rotation.

2. The inlet cone as claimed in claim 1, wherein said body comprises an end forming a tip made of said second material.

3. The inlet cone as claimed in claim 1, wherein each of the housings has a generally arcuate shape about the axis, and the second portions are configured to fill these housings completely.

4. The inlet cone according to claim 1, wherein each of the second portions has a Young's modulus of between 1 and 10 MPa, and preferably from 1 to 4 MPa.

5. The inlet cone according to claim 1, wherein each of the second portions has a maximum thickness of 4 mm, the thickness being measured in a longitudinal direction with respect to the axis.

6. The inlet cone according to claim 1, wherein each of the second portions comprises an external surface with a maximum radius (r) of 40 mm, the radius (r) being measured with respect to the axis.

7. The inlet cone according to claim 1, wherein each of the second portions has a density of between 500 and 1500 Kg/m$^3$, and preferably 1200 Kg/m$^3$.

8. The inlet cone according to claim 1, wherein each axial section is an angular sector of between 10 and 90°.

9. The inlet cone according to claim 1, wherein each second portion is made of elastomer, silicone, rubber or polytetrafluoroethylene (PTFE).

10. The inlet cone according to claim 1, wherein said first portion is made of composite or metallic material, for example aluminium.

11. An aircraft turbomachine comprising an inlet cone according to claim 1.

12. A method for using the aircraft turbomachine according to claim 11, wherein said cone is rotated either at a first speed which is at least greater than 5000 rpm, or at a second speed which is lower than said first speed, and in that:

when said cone rotates at the first speed, the second portions are configured to fragment ice (G) deposited on the cone, moving radially with respect to the axis, and when said cone is rotating at the second speed or at a standstill, the second portions are immobile.

13. The method according to claim 12, wherein the radial displacement of said flexible portions is greater than 0.02 mm.

14. The method according to claim 12, wherein the radial displacement of said flexible portions is between 0.02 and 0.20 mm.

* * * * *